United States Patent
Krasovskiy et al.

(10) Patent No.: US 12,534,562 B2
(45) Date of Patent: Jan. 27, 2026

(54) PROCESS FOR PREPARING OLEFIN-ACRYLATE BLOCK COPOLYMERS BY ATRP

(71) Applicant: Dow Global Technologies LLC, Midland, MI (US)

(72) Inventors: Arkady L. Krasovskiy, Lake Jackson, TX (US); Evelyn Auyeung, Houston, TX (US); Bryan D. Stubbert, Midland, MI (US); Anna V. Davis, Midland, MI (US); Jianbo Hou, Midland, MI (US); Clark H. Cummins, Midland, MI (US)

(73) Assignee: Dow Global Technologies LLC, Midland, TX (US)

( * ) Notice: Subject to any disclaimer, the term of this patent is extended or adjusted under 35 U.S.C. 154(b) by 512 days.

(21) Appl. No.: 17/997,480

(22) PCT Filed: Apr. 29, 2021

(86) PCT No.: PCT/US2021/030008
§ 371 (c)(1),
(2) Date: Oct. 28, 2022

(87) PCT Pub. No.: WO2021/222655
PCT Pub. Date: Nov. 4, 2021

(65) Prior Publication Data
US 2023/0167222 A1    Jun. 1, 2023

Related U.S. Application Data

(60) Provisional application No. 63/018,272, filed on Apr. 30, 2020.

(51) Int. Cl.
*C08F 293/00* (2006.01)

(52) U.S. Cl.
CPC ...... *C08F 293/005* (2013.01); *C08F 2438/01* (2013.01)

(58) Field of Classification Search
CPC .......................... C08F 293/00; C08F 293/005
See application file for complete search history.

(56) References Cited

U.S. PATENT DOCUMENTS

| | | |
|---|---|---|
| 5,945,491 A | 8/1999 | Matyjaszewski et al. |
| 7,858,706 B2 | 12/2010 | Arriola et al. |
| 8,198,374 B2 | 6/2012 | Arriola et al. |
| 8,318,864 B2 | 11/2012 | Harris et al. |
| 8,445,610 B2 | 5/2013 | Kwak et al. |
| 8,609,779 B2 | 12/2013 | Harris et al. |
| 8,686,087 B2 | 4/2014 | Shan et al. |
| 8,710,143 B2 | 4/2014 | Arriola et al. |
| 8,716,400 B2 | 5/2014 | Carnahan et al. |
| 8,785,551 B2 | 7/2014 | Arriola et al. |
| 8,822,598 B2 | 9/2014 | Shan et al. |
| 9,243,090 B2 | 1/2016 | Arriola et al. |
| 2006/0074210 A1 | 4/2006 | Simal et al. |

FOREIGN PATENT DOCUMENTS

| | | |
|---|---|---|
| WO | WO2010038046 A1 * | 4/2010 |
| WO | 2017044547 | 3/2017 |

OTHER PUBLICATIONS

Shipp, Devon A. et al. Macromolecules vol. 31 pp. 8005-8008 (Year: 1998).*
Narrainen, Amilcar. P. et al. Journal of Polymer Science Part A: Polymer Chemistry. vol 40 pp. 439-450 (Year: 2002).*
Benoit, "Development for a Universal Alkoxyamine for 'Living' Free Radical Polymerization" 1999, vol. 121, p. 3904-3920.
Davis, "Atom Transfer Radical Polymerization of tert-Butyl Acrylate and Preparation of Block Copolymers" 2000, vol. 33, p. 4039-4047.
Williams, "The Construction of a Polyethylene Calibration Curve for Gel Permeation Chromatography Using Polystyrene Fractions," 1968, vol. 6, p. 621-624.
Rzayev Javid et al., "Controlled/Living Free-Radical Polymerization under Very High Pressure", Macromolecules, 2002, pp. 1489-1490, vol. 35, No. 5.
PCT/US2021/030008, International Search Report and Written Opinion with a mailing date of Jul. 29, 2021.

* cited by examiner

*Primary Examiner* — Jeffrey S Lenihan
(74) *Attorney, Agent, or Firm* — Karen L. Beckman (57) ABSTRACT

The present disclosure relates to a process for preparing an olefin-acrylate block copolymer, the process comprising: a) performing atom transfer radical polymerization (ATRP) by combining ATRP materials comprising an acrylate monomer, an initiator having a radically transferrable atom or group, a transition metal compound, and a ligand, thereby forming a macroinitiator; and b) combining reaction materials comprising an alpha-substituted acrylate and the macroinitiator, thereby forming the olefin-acrylate block copolymer.

6 Claims, 4 Drawing Sheets

△ Peak 1_end-OCH$_3$
■ Peak 2_Backbone
○ Peak 3_end-Octyl

△ Peak 1_end-OCH$_3$
■ Peak 2_Backbone
○ Peak 3_endOctyl

PROCESS FOR PREPARING OLEFIN-ACRYLATE BLOCK COPOLYMERS BY ATRP

CROSS-REFERENCE TO RELATED APPLICATIONS

The present application claims the benefit of priority to U.S. Provisional Application No. 63/018,272, filed on Apr. 30, 2020, which is incorporated herein by reference in its entirety.

BACKGROUND

The present disclosure is directed to a process to synthesize olefin-acrylate block copolymers using atom transfer radical polymerization (ATRP) of acrylate monomers to prepare a functionalized polyacrylate that is subsequently reacted with an alpha-substituted acrylate monomer (such as an alpha-(alkyl) acrylate monomer or an alpha-(polymeryl) acrylate monomer). During the process, the alpha-substituted acrylate monomer, which is amenable to reaction using standard ATRP processes known in the art, is employed as a monomer that reacts with a polyacrylate produced by ATRP to form an olefin-acrylate block copolymer. This process and the resulting olefin-acrylate block copolymer have not been realized until the disclosures of the present application.

SUMMARY

The present disclosure is directed to a process for preparing an olefin-acrylate block copolymer, the process comprising:
a) performing atom transfer radical polymerization (ATRP) by combining ATRP materials comprising an acrylate monomer, an initiator having a radically transferrable atom or group, a transition metal compound, and a ligand, thereby forming a macroinitiator; and
b) combining reaction materials comprising an alpha-substituted acrylate and the macroinitiator, thereby forming the olefin-acrylate block copolymer.

The present disclosure is further directed to the olefin-acrylate block copolymer prepared by the present process.

DETAILED DESCRIPTION

Definitions

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups.

Unless stated to the contrary, implicit from the context, or customary in the art, all parts and percents are based on weight.

For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The numerical ranges disclosed herein include all values from, and including, the lower and upper value. For ranges containing explicit values (e.g., 1, or 2, or 3 to 5, or 6, or 7), any subrange between any two explicit values is included (e.g., 1 to 2; 2 to 6; 5 to 7; 3 to 7; 5 to 6; etc.). The numerical ranges disclosed herein further include the fractions between any two explicit values.

The terms "comprising," "including," "having" and their derivatives are not intended to exclude the presence of any additional component, step or procedure, whether or not the same is specifically disclosed. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination.

As used herein, the terms "hydrocarbyl," "hydrocarbyl group," and like terms refer to compounds composed entirely of hydrogen and carbon, including aliphatic, aromatic, acyclic, cyclic, polycyclic, branched, unbranched, saturated, and unsaturated compounds. The terms "hydrocarbyl," "hydrocarbyl group," "alkyl," "alkyl group," "aryl," "aryl group," and like terms are intended to include every possible isomer, including every structural isomer or stereoisomer.

The term "cyclic" refers to a series of atoms in a polymer or compound where such a series includes one or more rings. Accordingly, the term "cyclic hydrocarbyl group" refers to a hydrocarbyl group that contains one or more rings. A "cyclic hydrocarbyl group," as used herein, may contain acyclic (linear or branched) portions in addition to the one or more rings.

The term "polymer" refers to a material prepared by reacting (i.e., polymerizing) a set of monomers, wherein the set is a homogenous (i.e., only one type) set of monomers or a heterogeneous (i.e., more than one type) set of monomers. The term polymer as used herein includes the term "homopolymer," which refers to polymers prepared from a homogenous set of monomers, and the term "interpolymer" as defined below.

The term "interpolymer" refers to a polymer prepared by the polymerization of at least two different types of monomers. This term include both "copolymers," i.e., polymers prepared from two different types of monomers, and polymers prepared from more than two different types of monomers, e.g., terpolymers, tetrapolymers, etc. This term also embraces all forms of interpolymers, such as random, block, homogeneous, heterogeneous, etc.

A "polyolefin" is a polymer produced from the polymerization of an olefin as a monomer, where an olefin monomer is a linear, branched, or cyclic compound of carbon and hydrogen having at least one double bond. Accordingly, the term "polyolefin," as used herein, includes and covers the terms "ethylene-based polymer," "propylene-based polymer," "ethylene homopolymer," "propylene homopolymer," "ethylene/alpha-olefin interpolymer," "ethylene/alpha-olefin copolymer," "ethylene/alpha-olefin multiblock interpolymer," "block composite," "specified block composite," "crystalline block composite," "propylene/alpha-olefin interpolymer," and "propylene/alpha-olefin copolymer."

An "ethylene-based polymer" is a polymer that contains a majority amount of polymerized ethylene, based on the weight of the polymer, and, optionally, may further contain polymerized units of at least one comonomer. An "ethylene-based interpolymer" is an interpolymer that contains, in polymerized form, a majority amount of ethylene, based on the weight of the interpolymer, and further contains polymerized units of at least one comonomer. An "ethylene homopolymer" is a polymer that comprises repeating units derived from ethylene but does not exclude residual amounts of other components.

The term "ethylene/alpha-olefin interpolymer," as used herein, refers to a polymer that comprises, in polymerized form, a majority weight percent of ethylene (based on the weight of the interpolymer), and at least one comonomer that is an alpha-olefin. The ethylene/alpha-olefin interpolymer may be a random or block interpolymer. The terms "ethylene/alpha-olefin copolymer" and "ethylene/alpha-olefin multi-block interpolymer" are covered by the term "ethylene/alpha-olefin interpolymer."

The term "ethylene/alpha-olefin copolymer," as used herein, refers to a copolymer that comprises, in polymerized form, a majority weight percent of ethylene (based on the weight of the copolymer), and a comonomer that is an alpha-olefin, where ethylene and the alpha-olefin are the only two monomer types. The ethylene/alpha-olefin copolymer may be a random or block copolymer.

The term "ethylene/alpha-olefin multi-block interpolymer" or "olefin block copolymer," as used herein, refers to an interpolymer that includes ethylene and one or more copolymerizable alpha-olefin comonomers in polymerized form, characterized by multiple blocks or segments of two or more (preferably three or more) polymerized monomer units, the blocks or segments differing in chemical or physical properties. Specifically, this term refers to a polymer comprising two or more (preferably three or more) chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. The blocks differ in the amount or type of comonomer incorporated therein, the density, the amount of crystallinity, the type of crystallinity (e.g., polyethylene versus polypropylene), the crystallite size attributable to a polymer of such composition, the type or degree of tacticity (isotactic or syndiotactic), region-regularity or region-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a shuttling agent(s) in combination with catalyst systems. Non-limiting examples of the olefin block copolymers of the present disclosure, as well as the processes for preparing the same, are disclosed in U.S. Pat. Nos. 7,858,706 B2, 8,198,374 B2, 8,318,864 B2, 8,609,779 B2, 8,710,143 B2, 8,785,551 B2, and 9,243,090 B2, which are all incorporated herein by reference in their entirety.

The term "block composite" ("BC") refers to a polymer comprising three polymer components: (i) an ethylene-based polymer (EP) having an ethylene content from 10 mol % to 90 mol % (a soft copolymer), based on the total moles of polymerized monomer units in the ethylene-based polymer (EP); (ii) an alpha-olefin-based polymer (AOP) having an alpha-olefin content of greater than 90 mol % (a hard copolymer), based on the total moles of polymerized monomer units in the alpha-olefin-based polymer (AOP); and (iii) a block copolymer (diblock copolymer) having an ethylene block (EB) and an alpha-olefin block (AOB); wherein the ethylene block of the block copolymer is the same composition as the EP of component (i) of the block composite and the alpha-olefin block of the block copolymer is the same composition as the AOP of component (ii) of the block composite. Additionally, in the block composite, the compositional split between the amount of EP and AOP will be essentially the same as that between the corresponding blocks in the block copolymer. Non-limiting examples of the block composites of the present disclosure, as well as processes for preparing the same, are disclosed in U.S. Pat. Nos. 8,686,087 and 8,716,400, which are incorporated herein by reference in their entirety.

The term "specified block composite" ("SBC") refers to a polymer comprising three polymer components: (i) an ethylene-based polymer (EP) having an ethylene content from 78 mol % to 90 mol % (a soft copolymer), based on the total moles of polymerized monomer units in the ethylene-based polymer (EP); (ii) an alpha-olefin-based polymer (AOP) having an alpha-olefin content of from 61 mol % to 90 mol % (a hard copolymer), based on the total moles of polymerized monomer units in the alpha-olefin-based polymer (AOP); and (iii) a block copolymer (diblock copolymer) having an ethylene block (EB) and an alpha-olefin block (AOB); wherein the ethylene block of the block copolymer is the same composition as the EP of component (i) of the specified block composite and the alpha-olefin block of the block copolymer is the same composition as the AOP of component (ii) of the specified block composite. Additionally, in the specified block composite, the compositional split between the amount of EP and AOP will be essentially the same as that between the corresponding blocks in the block copolymer. Non-limiting examples of the specified block composites of the present disclosure, as well as processes for preparing the same, are disclosed in WO 2017/044547, which is incorporated herein by reference in its entirety.

The term "crystalline block composite" ("CBC") refers to polymers comprising three components: (i) a crystalline ethylene based polymer (CEP) having an ethylene content of greater than 90 mol %, based on the total moles of polymerized monomer units in the crystalline ethylene based polymer (CEP); (ii) a crystalline alpha-olefin based polymer (CAOP) having an alpha-olefin content of greater than 90 mol %, based on the total moles of polymerized monomer units in the crystalline alpha-olefin based copolymer (CAOP); and (iii) a block copolymer comprising a crystalline ethylene block (CEB) and a crystalline alpha-olefin block (CAOB); wherein the CEB of the block copolymer is the same composition as the CEP of component (i) of the crystalline block composite and the CAOB of the block copolymer is the same composition as the CAOP of component (ii) of the crystalline block composite. Additionally, in the crystalline block composite, the compositional split between the amount of CEP and CAOP will be essentially the same as that between the corresponding blocks in the block copolymer. Non-limiting examples of the crystalline block composites of the present disclosure, as well as the processes for preparing the same, are disclosed in U.S. Pat. No. 8,822,598 B2 and WO 2016/01028961 A1, which are incorporated herein by reference in its entirety.

A "propylene-based polymer" is a polymer that contains a majority amount of polymerized propylene, based on the weight of the polymer, and, optionally, may further contain polymerized units of at least one comonomer. A "propylene-based interpolymer" is an interpolymer that contains, in polymerized form, a majority amount of propylene, based on the weight of the interpolymer, and further contains polymerized units of at least one comonomer. A "propylene homopolymer" is a polymer that comprises repeating units derived from propylene but does not exclude residual amounts of other components.

The term "propylene/alpha-olefin interpolymer," as used herein, refers to a polymer that comprises, in polymerized form, a majority weight percent of propylene (based on the weight of the interpolymer), and at least one comonomer that is an alpha-olefin (where ethylene is considered an alpha-olefin). The propylene/alpha-olefin interpolymer may be a random or block interpolymer. The term "propylene/alpha-olefin interpolymer" includes the term "propylene/alpha-olefin copolymer."

The term "propylene/alpha-olefin copolymer," as used herein, refers to a copolymer that comprises, in polymerized form, a majority weight percent of propylene (based on the weight of the copolymer), and a comonomer that is an alpha-olefin, wherein propylene and the alpha-olefin are the only two monomer types. The propylene/alpha-olefin copolymer may be a random or block copolymer.

The terms "polymeryl," "polymeryl group" and like terms refer to a polymer missing one hydrogen.

The terms "polyolefinyl," "polyolefinyl group" and like terms refer to a polyolefin missing one hydrogen.

Atom Transfer Radical Polymerization (ATRP)

Step a) of the process of the present disclosure is directed to forming a functionalized polyacrylate via ATRP. Specifically, step a) of the present process is directed to performing ATRP by combining ATRP materials comprising an acrylate monomer, an initiator having a radically transferrable atom or group, a transition metal compound, and a ligand, thereby forming a macroinitiator. Techniques and conditions suitable for ATRP for step a) are known in the art and include, for example, those described in Macromolecules, 33, 4039-4047, 2000 and U.S. Pat. No. 5,945,491, which are incorporated herein by reference. Indeed, each of the initiator, the transition metal compound, and the ligand of the ATRP materials are known in the art and disclosed, for example, in U.S. Pat. No. 5,945,491.

In certain embodiments, the acrylate monomer of step a) has the formula (III):

(III)

wherein R1 is hydrogen or a C1-C30 hydrocarbyl group and R2 is hydrogen or a methyl group.

In certain embodiments, R1 is a C1-C30 hydrocarbyl group that may be linear, branched, or cyclic. In further embodiments, R1 is a C1-C30 alkyl group that may be linear, branched, or cyclic. For example, R1 may be a linear, branched, or cyclic alkyl group comprising from 1 to 30 carbon atoms, or from 1 to 20 carbon atoms, or from 1 to 10 carbon atoms, or from 1 to 8 carbon atoms.

In certain embodiments, the initiator has the formula (IV):

(IV)

wherein:

X is selected from the group consisting of a halide (preferably Cl, Br, or I), $OR^{10}$, $SR^{14}$, $SeR^{14}$, —SCN (thiocyanate), $OC(=O)R^{14}$, $OP(=O)R^{14}$, $OP(=O)(OR^{14})_2$, $OP(=O)OR^{14}$, $O-N(R^{14})_2$, and $S-C(=S)N(R^{14})_2$, where $R^{14}$ is aryl or a straight or branched C1-C20 (preferably C1-C10) alkyl group, or when an $N(R^{14})_2$ group is present, the two $R^{14}$ groups may be joined to form a 5-, 6-, or 7-membered heterocyclic ring, and where $R^{10}$ is alkyl of from 1 to 20 carbon atoms, in which each of the hydrogen atoms may be independently replaced by halide;

R11, R12, and R13 are each independently selected from the group consisting of H, halide, C1-C20 alkyl (preferably C1-C10 alkyl and more preferably C1-C6 alkyl), C3-C8 cycloalkyl, $C(=Y)R^5$, $C(=Y)NR^6R7$, COCl, OH (preferably only one of R11, R12 and R13 is OH), CN, C2-C20 alkenyl or alkynyl (preferably C2-C6 alkenyl or alkynyl, and more preferably vinyl), oxiranyl, glycidyl, aryl, heterocyclyl, aralkyl, aralkylene (aryl-substituted alkenyl, and alkenyl is vinyl which may be substituted with one or two C1-C6 alkyl groups and/or halogen atoms, preferably chlorine), C1-C6 alkyl in which from 1 to all of the hydrogen atoms (preferably 1) are replaced with halogen (preferably fluorine or chlorine where 1 or more hydrogen atoms are replaced, and preferably fluorine, chlorine or bromine where 1 hydrogen atom is replaced) and C1-C6 alkyl substituted with from 1 to 3 substituents (preferably 1) selected from the group consisting of C1-C4 alkoxy, aryl, heterocyclyl, $C(=Y)R^6$, $C(=Y)NR^6R^7$, oxiranyl and glycidyl; such that no more than two of $R^{11}$, $R^{12}$ and $R^{13}$ are H (preferably no more than one of $R^{11}$, $R^{12}$ and $R^{13}$ is H); Y may be $NR^8$ or O (preferably O); and $R^5$ is alkyl of from 1 to 20 carbon atoms, alkoxy of from 1 to 20 carbon atoms, aryloxy or heterocyclyloxy, $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring, and $R^8$ is H, straight or branched C1-C20 alkyl and aryl.

When an alkyl, cycloalkyl, or alkyl-substituted aryl group is selected for one of R11, R12 and R13, the alkyl group may be further substituted with a halogen. Thus, it is possible for the initiator to serve as a starting molecule for branch or star (co)polymers. A preferred example is where one of R11, R12 and R13 is phenyl substituted with from one to five C—C alkyl substituents, each of which may independently be further substituted with a halogen.

The transition metal compound of step a) of the present disclosure may be any transition metal compound which can participate in a redox cycle with the initiator and dormant polymer chain, but which does not form a direct carbon-metal bond with the polymer chain. Preferred transition metal compounds are those of the formula $M_t^{Q+}X'_Q$, where: $M_t^{Q+}$ may be selected from the group consisting of $Cu^{1+}$, $Cu^{2+}$, $Fe^{2+}$, $Fe^{3+}$, $Ru^{2+}$, $Ru^{3+}$, $Cr^{2+}$, $Cr^{3+}$, $Mo^0$, $Mo^+$, $Mo^{2+}$, $Mo^{3+}$, $W^{2+}$, $W^{3+}$, $Rh^{3+}$, $Rh^{4+}$, $Co^+$, $CO^{2+}$, $Re^{2+}$, $Re^{3+}$, $Ni^0$, $Ni^+$, $Mn^{3+}$, $Mn^{4+}$, $V^{2+}$, $V^{3+}$, $Zn^+$, $Zn^{2+}$, $Au^+$, $Au^{2+}$, $Ag^+$ and $Ag^{2+}$; and X' is selected from the group consisting of halogen, C1-C20-alkoxy, $(SO_4)_{1/2}$, $(PO_4)_{1/3}$, $(HPO_4)_{1/2}$, $(H_2PO_4)$, triflate, SCN (thiocyanate), hexafluorophosphate, alkylsulfonate, arylsulfonate (preferably benzenesulfonate or toluenesulfonate), $SeR^{14}$, CN and $R^{15}CO_2$, where R14 is as defined above and $R^{15}$ is H or a straight or branched C1-C20 alkyl group (preferably methyl), a benzoic acid derivative, aryl or a heteroaryl group which may be substituted from 1 to 5 times with a halogen (preferably 1 to 3 times with fluorine or chlorine); and Q is the formal charge on the metal (e.g., $0 \leq Q \leq 7$).

Although any transition metal compound is suitable in the present disclosure, a transition metal halide is preferred, such as copper iodide, copper bromide, or copper chloride.

Suitable ligands for use in the present disclosure include ligands having one or more nitrogen, oxygen, phosphorus and/or sulfur atoms which can coordinate to the transition metal through a sigma-bond, and ligands containing two or more carbon atoms which can coordinate to the transition metal through a pi-bond. Preferred N—, O—, P- and S-containing ligands may have one of the following formulas:

where:
$R^{16}$ and $R^{17}$ are independently selected from the group consisting of H, C1-C20 alkyl, aryl, heterocyclyl, and C1-C6 alkyl substituted with C1-C6 alkoxy, C1-C4 dialkylamino, $C(=Y)R^5$, $C=Y)R^6R^7$ and $YC(=Y)R^8$, where Y, $R^5$, $R^6$, $R^7$ and $R^8$ are as defined above; or $R^{16}$ and $R^{17}$ can be joined to form a saturated, unsaturated or heterocyclic ring;

Z' is O, S, $NR^{19}$ or $PR^{19}$, where $R^{19}$ is selected from the same group as $R^{16}$ and $R^{17}$;

each $R^{18}$ is independently a divalent group selected from the group consisting of C2-C4 alkylene (alkanediyl) and C2-C4 alkenylene where the covalent bonds to each Z' are at vicinal positions (e.g., in a 1,2-arrangement) or at beta-positions (e.g., in a 1,3-arrangement), and from C3-C8 cycloalkanediyl, C3-C8 cycloalkenediyl, arenediyl and heterocyclylene where the covalent bonds to each Z' are at vicinal positions; and L is from 1 to 6.

In addition to the above ligands, each of $R^{16}$—Z' and $R^{17}$—Z' can form a ring with the $R^{18}$ group to which the Z' is bound to form a linked or fused heterocyclic ring system. Alternatively, when $R^{16}$ and/or $R^{17}$ are heterocyclyl, Z' can be a covalent bond (which may be single or double), CH2 or a 4- to 7-membered ring fused to $R^{16}$ and/or $R^{17}$, in addition to the definitions given above for Z'. Exemplary ring systems for the present ligand include bipyridine, bipyrrole, 1,10-phenanthroline, a cryptand, a crown ether, etc., where Z' is $PR^{19}$, $R^{19}$ can also be C1-C20-alkoxy.

Included as suitable ligands are pyridine derivatives which contain substituents in the 2 or 2 and 6 position such as a carbonyl containing moiety, an imine containing moiety or a thioketone containing moiety.

Also included as suitable ligands in the present disclosure are CO (carbon monoxide), porphyrins and porphycenes, the latter two of which may be substituted with from 1 to 6 (preferably from 1 to 4) halogen atoms, C1-C6 alkyl groups, C1-C6-alkoxy groups, C1-C6 alkoxycarbonyl, aryl groups, heterocyclyl groups, and C1-C6 alkyl groups further substituted with from 1 to 3 halogens.

Further ligands suitable for use in the present invention include compounds of the formula $R^{20}R^{21}C(C(=Y)R^5)_2$, where Y and $R^5$ are as defined above, and each of $R^{20}$ and $R^{21}$ is independently selected from the group consisting of H, halogen, C1-C20 alkyl, aryl and heterocyclyl, and $R^{20}$ and $R^{21}$ may be joined to form a C3-C8 cycloalkyl ring or a hydrogenated (i.e., reduced, non-aromatic or partially or fully saturated) aromatic or heterocyclic ring, any of which (except for H and halogen) may be further substituted with 1 to 5 and preferably 1 to 3 C1-C6 alkyl groups, C1-C6 alkoxy groups, halogen atoms and/or aryl groups. Preferably, one of $R^{20}$ and $R^{21}$ is H or a negative charge.

Additional suitable ligands include, for example, ethylenediamine and propylenediamine, both of which may be substituted from one to four times on the amino nitrogen atom with a C1-C4 alkyl group or a carboxymethyl group; aminoethanol and aminopropanol, both of which may be substituted from one to three times on the oxygen and/or nitrogen atom with a C1-C4 alkyl group; ethylene glycol and propylene glycol, both of which may be substituted one or two times on the oxygen atoms with a C1-C4 alkyl group; diglyme, triglyme, tetraglyme, etc.

Suitable carbon-based ligands include arenes and the cyclopentadienyl ligand. Preferred carbon-based ligands include benzene (which may be substituted with from one to six C1-C4 alkyl groups, e.g., methyl) and cyclopentadienyl (which may be substituted with from one to five methyl groups, or which may be linked through an ethylene or propylene chain to a second cyclopentadienyl ligand). Where the cyclopentadienyl ligand is used, it may not be necessary to include a counteranion (X') in the transition metal compound.

Preferred ligands include unsubstituted and substituted pyridines and bipyridines, acetonitrile, $(R^{10}O)_3P$, $PR^{10}_3$, 1,10-phenanthroline, porphyrin, cryptands such as K222, crown ethers such as 18-crown-6, and nitrogen or sulfur analogs of crown ethers. The most preferred ligands are substituted bipyridine, bipyridine and $(R^{10}O)_3P$. Examples of such ligands (but not limited to) are 2,2'-bipyridine, a p-alkyl substituted derivative of the 2,2'-bipyridine or a p-alkoxy substituted derivative of the 2,2'-bipyridine.

The mole ratio of the initiator, the transition metal compound and the ligand may range from 1/0.01/0.02 to 1/4/12.

In certain embodiments, the macroinitiator formed in step a) has the formula (V):

wherein:
"polyacrylate" represents the polyacrylate resulting from ATRP of the acrylate monomer (III); X is as defined herein (preferably Cl, Br, or I); and y is from 1 to 100.

In certain embodiments, step a) of the present process may be performed neat. In further embodiments, the ATRP materials in step a) of the present process further comprise a solvent.

In certain embodiments, step a) of the present process is performed at a temperature that is suitable for ATRP. For example and without limitation, step a) of the present process may be performed at a temperature from 40 to 150° C.

The amounts and ratios of the ATRP materials in step a) may be adjustable and will be known by a person of ordinary skill in the art.

Reaction with an Alpha-Substituted Acrylate

Step b) of the present process is directed to reacting a functionalized polyacrylate prepared in step a) with an alpha-substituted acrylate, such as an alpha-(alkyl) acrylate or an alpha-(polymeryl) acrylate, to form an olefin-acrylate block copolymer. Specifically, step b) of the present process is directed to combining reaction materials comprising the alpha-substituted acrylate and the macroinitiator of the formula (V), thereby forming the olefin-acrylate block copolymer.

In certain embodiments, the alpha-substituted acrylate has the formula (II):

(II)

wherein R is a C1-C26 hydrocarbyl group or a polyolefinyl group; and
R1 is hydrogen or a C1-C30 hydrocarbyl group.
R1 may be any embodiment as described previously.

In certain embodiments, R is a C1-C26 hydrocarbyl group. In embodiments wherein R is a C1-C26 hydrocarbyl group, R may be a C1-C26 alkyl group that may be linear, branched, or cyclic. For example, R may be a linear, branched, or cyclic alkyl group comprising from 1 to 26 carbon atoms, or from 1 to 10 carbon atoms, or from 1 to 8 carbon atoms.

In further embodiments, R is a polyolefinyl group. In certain embodiments, R is a polyolefinyl group, which can be defined by the properties of R—H, wherein R—H has a number average molecular weight of greater than 365 g/mol. In further embodiments, R is a polyolefinyl group, which can be defined by the properties of R—H, wherein R—H has a number average molecular weight from greater than 365 g/mol to 10,000,000 g/mol, or from greater than 365 g/mol to 5,000,000 g/mol, or from greater than 365 g/mol to 1,000,000 g/mol, or from greater than 365 g/mol to 750,000 g/mol, or from greater than 365 g/mol to 500,000 g/mol, or from greater than 365 g/mol to 250,000 g/mol.

In further embodiments, R is a polyolefinyl group, which can be defined by the properties of R—H, wherein R—H has a density from 0.850 to 0.965 g/cc, or from 0.860 to 0.950 g/cc, or from 0.865 to 0.925 g/cc.

In further embodiments, R is a polyolefinyl group, which can be defined by the properties of R—H, wherein R—H has a melt index (I2) from 0.01 to 2,000 g/10 minutes, or from 0.01 to 1,500 g/10 minutes, or from 0.1 to 1,000 g/10 minutes, or from 0.1 to 500 g/10 minutes, or from 0.1 to 100 g/10 minutes.

In further embodiments, R is a polyolefinyl group, which can be defined by the properties of R—H, wherein R—H has a number average molecular weight distribution (Mw/Mn or PDI) from 1 to 10, or from 1 to 7, or from 1 to 5, or from 2 to 4.

In certain embodiments, R is an ethylene homopolymeryl group comprising units derived from ethylene.

In certain embodiments, R is an ethylene/alpha-olefin interpolymeryl group comprising units derived from ethylene and at least one C3-C30 alpha-olefin. The C3-C30 alpha-olefin may be, for example, 1-butene, 4-methyl-1-pentene, 1-hexene, 1-octene, 1-decene, 1-dodecene, 1-tetradecene, 1-hexadecene, or 1-octadecene.

In certain embodiments, R is an ethylene/alpha-olefin copolymeryl group comprising units derived from ethylene and a C3-C30 alpha-olefin. The C3-C30 alpha-olefin may be, for example, propylene, 1-butene, 4-methyl-1-pentene, 1-hexene, 1-octene, 1-decene, 1-dodecene, 1-tetradecene, 1-hexadecene, or 1-octadecene.

In certain embodiments, R is an ethylene/alpha-olefin multi-block interpolymeryl group or olefin block copolymeryl group as defined herein.

In further embodiments, R is a polymeryl group of a block composite, a specified block composite, or a crystalline block composite, as defined herein.

In certain embodiments, R is a propylene homopolymeryl group comprising units derived from propylene.

In certain embodiments, R is a propylene/alpha-olefin interpolymeryl group comprising units derived from propylene and at least one comonomer that is ethylene or a C3-C30 alpha-olefin. The C3-C30 alpha-olefin may be, for example, propylene, 1-butene, 4-methyl-1-pentene, 1-hexene, 1-octene, 1-decene, 1-dodecene, 1-tetradecene, 1-hexadecene, or 1-octadecene.

In certain embodiments, R is a propylene/alpha-olefin copolymeryl group comprising units derived from propylene and a comonomer that is ethylene or a C3-C30 alpha-olefin. The C3-C30 alpha-olefin may be, for example, propylene, 1-butene, 4-methyl-1-pentene, 1-hexene, 1-octene, 1-decene, 1-dodecene, 1-tetradecene, 1-hexadecene, or 1-octadecene.

The alpha-substituted acrylate of the formula (II) may be prepared by any suitable process. A non-limiting process for preparing the alpha-substituted acrylate of the formula (II) is the process disclosed in copending U.S. Provisional Application Nos. 62/954,941 and 62/954,956. For example, the alpha-substituted acrylate of the formula (II) may be prepared by combining materials comprising an alpha-(halomethyl) acrylate and an organometallic compound of the formula $R_2Zn$ or $R_3Al$, wherein R is as defined herein. In such a non-limiting process, a nucleophilic substitution reaction occurs whereby a halogen is a leaving group that is replaced by an R of the organometallic compound of the formula $R_2Zn$ or $R_3Al$.

In certain embodiments, the resulting olefin-acrylate block copolymer of the present process has the formula (VI):

(VI)

Each of "polyacrylate," R, R1, X, and y are as defined herein, and m is from 1 to 50.

As seen with Formula (VI), the polymer architecture of the olefin-acrylate block copolymer prepared via the process of the present disclosure may vary. Examples of the polymeric architecture include linear diblock copolymers, hyperbranched diblock copolymers, multi-arm diblock copolymers, and comb/brush diblock copolymers. For example, in step b) when a mono-functional ATRP initiator is used (y=1), adding one equivalent of the alpha-substituted acrylate to the macroinitiator will prepare a linear diblock copolymer, and adding "m" equivalents of the alpha-substi- tuted acrylate to the macroinitiator will prepare a diblock copolymer with a comb-type polyolefin block.

In certain embodiments, step b) of the present process may be performed neat. In further embodiments, the reaction materials in step b) of the present process further comprise a solvent.

For example and without limitation, step b) of the present process may be performed at a temperature from 40 to 150° C.

The amounts and ratios of the reaction materials in step b) may be adjustable and will be known by a person of ordinary skill in the art.

The present process may be described but is not limited to the following scheme.

Specific embodiments of the present disclosure include but are not limited to the following:

1. A process for preparing an olefin-acrylate block copolymer, the process comprising:
    a) performing atom transfer radical polymerization (ATRP) by combining ATRP materials comprising an acrylate monomer, an initiator having a radically transferrable atom or group, a transition metal compound, and a ligand, thereby forming a macroinitiator; and
    b) combining reaction materials comprising an alpha-substituted acrylate and the macroinitiator, thereby forming the olefin-acrylate block copolymer.

2. The process of embodiment 1, wherein:
    the alpha-substituted acrylate has the formula (II):

the acrylate monomer has the formula (III):

the initiator has the formula (IV):

the macroinitiator has the formula (V):

polyacrylate-(X)$_y$.  (V);

the olefin-acrylate block copolymer has the formula (VI):

wherein:
each $R_1$ independently is hydrogen or a C1-C30 hydrocarbyl group;
each $R_2$ independently is hydrogen or a methyl group;
each R independently is a C1-C26 hydrocarbyl group or a polyolefinyl group;
m is from 1 to 50;
each y independently is from 1 to 100;
each X independently is selected from the group consisting of a halide (preferably Cl, Br, or I), OR$^{10}$, SR$^{14}$, SeR$^{14}$, —SCN (thiocyanate), OC(=O)R$^{14}$, OP(=O)R$^{14}$, OP(=O)(OR$^{14}$)$_2$, OP(=O)OR$^{14}$, O—N(R$^{14}$)$_2$, and S—C(=S)N(R$^{14}$)$_2$, where R$^{14}$ is aryl or a straight or branched C1-C20 (preferably C1-C10) alkyl group, or when an N(R$^{14}$)$_2$ group is present, the two R$^{14}$ groups may be joined to form a 5-, 6-, or 7-membered heterocyclic ring, and where R$^{10}$ is alkyl of from 1 to 20 carbon atoms, in which each of the hydrogen atoms may be independently replaced by halide;
R11, R12, and R13 are each independently selected from the group consisting of H, halide, C1-C20 alkyl (preferably C1-C10 alkyl and more preferably C1-C6 alkyl), C3-C8 cycloalkyl, C(=Y)R5, C(=Y)NR$^6$R$^7$, COCl, OH (preferably only one of R$^{11}$, R$^{12}$ and R$^{13}$ is OH), CN, C2-C20 alkenyl or alkynyl (preferably C2-C6 alkenyl or alkynyl, and more preferably vinyl), oxiranyl, glycidyl, aryl, heterocyclyl, aralkyl, aralkylene (aryl-substituted alkenyl, and alkenyl is vinyl which may be substituted with one or two C1-C6 alkyl groups and/or halogen atoms, preferably chlorine), C1-C6 alkyl in which from 1 to all of the hydrogen atoms (preferably 1) are replaced with halogen (preferably fluorine or chlorine where 1 or more hydrogen atoms are replaced, and preferably fluorine, chlorine or bromine where 1 hydrogen atom is replaced) and C1-C6 alkyl substituted with from 1 to 3 substituents (preferably 1) selected from the group consisting of C1-C4 alkoxy, aryl, heterocyclyl, C(=Y)R$^6$, C(=Y)NR$^6$R$^7$, oxiranyl and glycidyl; such that no more than two of R$^{11}$, R$^{12}$ and R13 are H (preferably no more than one of R11, R12 and R13 is H);

Y may be NR$^8$ or O (preferably O);

R$^5$ is alkyl of from 1 to 20 carbon atoms, alkoxy of from 1 to 20 carbon atoms, aryloxy or heterocyclyloxy, R$^6$ and R$^7$ are independently H or alkyl of from 1 to 20 carbon atoms, or R$^6$ and R$^7$ may be joined together to form an alkylene group of from 2 to 5 carbon atoms, thus forming a 3- to 6-membered ring, and R$^8$ is H, straight or branched C1-C20 alkyl and aryl; and "polyacrylate" represents the polyacrylate resulting from ATRP of the acrylate monomer.

3. The process of any of the previous embodiments, wherein each R$^1$ independently is a C1-C30, or C1-C10, or C1-C8 alkyl group that is linear, branched, or cyclic.

4. The process of any of the previous embodiments, wherein each R independently is a C1-C26 hydrocarbyl group.

5. The process of embodiment 4, wherein each R independently is a C1-C26, or C1-C10, or C1-C8 alkyl group that is linear, branched, or cyclic.

6. The process of any of embodiments 1-3, wherein each R independently is a polyolefinyl group.

7. The process of embodiment 6, wherein the polyolefinyl group is an ethylene-based polymeryl group.

8. The process of embodiment 7, wherein the polyolefinyl group is an ethylene homopolymeryl group comprising units derived from ethylene.

9. The process of embodiment 7, wherein the polyolefinyl group is an ethylene/alpha-olefin interpolymeryl group comprising units derived from ethylene and a C3-C30 alpha-olefin.

10. The process of embodiment 7, wherein the polyolefinyl group is an ethylene/alpha-olefin copolymeryl group comprising units derived from ethylene and a C3-C30 alpha-olefin.

11. The process of embodiment 9 or 10, wherein the C3-C30 alpha-olefin is selected from the group consisting of propylene, 1-butene, 1-hexene, and 1-octene.

12. The process of embodiment 7, wherein the polyolefinyl group is an ethylene/alpha-olefin multiblock interpolymeryl group.

13. The process of embodiment 6, wherein the polyolefinyl group is selected from the group consisting of a polymeryl group of a block composite, a specified block composite, and a crystalline block composite.

14. The process of embodiment 6, wherein the polyolefinyl group is a propylene-based polymeryl group.

15. The process of embodiment 14, wherein the polyolefinyl group is a propylene homopolymeryl group comprising units derived from propylene.

16. The process of embodiment 14, wherein the polyolefinyl group is a propylene/alpha-olefin interpolymeryl group comprising units derived from propylene and either ethylene or a C4-C30 alpha-olefin.

17. The process of embodiment 14, wherein the polyolefinyl group is a propylene/alpha-olefin copolymeryl group comprising units derived from propylene and either ethylene or a C4-C30 alpha-olefin.

18. The process of embodiment 16 or 17, wherein the C4-C30 alpha-olefin is selected from the group consisting of 1-butene, 1-hexene, and 1-octene.

19. The process of any of embodiments 6-18, wherein the polyolefinyl group can be defined by the properties of R—H, and wherein R—H has a number average molecular weight of greater than 365 g/mol.

20. The process of any of embodiments 6-19, wherein the polyolefinyl group can be defined by the properties of R—H, and wherein R—H has a number average molecular weight of from greater than 365 g/mol to 10,000,000 g/mol, or from greater than 365 g/mol to 5,000,000 g/mol, or from greater than 365 g/mol to 1,000,000 g/mol, or from greater than 365 g/mol to 750,000 g/mol, or from greater than 365 g/mol to 500,000 g/mol, or from greater than 365 g/mol to 250,000 g/mol.

21. The process of any of embodiments 6-20, wherein the polyolefinyl group can be defined by the properties of R—H, and wherein R—H has a density from 0.850 to 0.965 g/cc, or from 0.860 to 0.950 g/cc, or from 0.865 to 0.925 g/cc.

22. The process of any of embodiments 6-21, wherein the polyolefinyl group can be defined by the properties of R—H, and wherein R—H has a melt index (I2) from 0.01 to 2,000 g/10 minutes, or from 0.01 to 1,500 g/10 minutes, or from 0.1 to 1,000 g/10 minutes, or from 0.1 to 500 g/10 minutes, or from 0.1 to 100 g/10 minutes.

23. The process of any of embodiments 6-22, wherein the polyolefinyl group can be defined by the properties of R—H, and wherein R—H has a number average molecular weight distribution (Mw/Mn) from 1 to 10, or from 1 to 7, or from 1 to 5, or from 2 to 4.

24. The process of any of embodiments 2-23, wherein y is 1, and m is 1.

25. The process of any of the previous embodiments, wherein each of steps a) and b) is performed at a temperature from 40° C. to 150° C.

26. The process of any of the previous embodiments, wherein the alpha-substituted acrylate is prepared by a process comprising combining starting materials comprising an alpha-(halomethyl) acrylate and an organometallic compound of the formula R$_2$Zn or R$_3$Al, wherein the alpha-(halomethyl) acrylate has the formula (I):

(I)

wherein:

X is a halide, and R and R$_1$ are as defined above.

27. The process of any of the previous embodiments, wherein the transition metal compound is a transition metal halide, and wherein the ligand is a N—, O—, P—, or S-containing ligand which coordinates in a sigma-bond or pi-bond to the transition metal compound, or any C-containing compound which can coordinate in a pi-bond to the transition metal compound.

28. The process of any of the previous embodiments, wherein the ATRP materials and/or the reaction materials further comprise a solvent.

29. An olefin-acrylate block copolymer having the formula (VI):

(VI)

wherein:
"polyacrylate" represents the polyacrylate resulting from atom transfer radical
polymerization (ATRP) of an acrylate monomer;
R1 is hydrogen or a C1-C30 hydrocarbyl group;
R is a C1-C26 hydrocarbyl group or a polyolefinyl group;
m is from 1 to 50;
y is from 1 to 100; and
X is selected from the group consisting of a halide (preferably Cl, Br, or I), $OR^{10}$, $SR^{14}$, $SeR^{14}$, —SCN (thiocyanate), OC(=O)R14, OP(=O)R14, $OP(=O)(OR^{14})_2$, $OP(=O)OR^{14}$, O—N(R14)$_2$, and S—C(=S)N(R14)$_2$, where R14 is aryl or a straight or branched C1-C20 (preferably C1-C10) alkyl group, or when an N(R14)$_2$ group is present, the two $R^{14}$ groups may be joined to form a 5-, 6-, or 7-membered heterocyclic ring, and where $R^{10}$ is alkyl of from 1 to 20 carbon atoms, in which each of the hydrogen atoms may be independently replaced by halide.

30. The olefin-acrylate block copolymer of embodiment 29, wherein each R1 independently is a C1-C30, or C1-C10, or C1-C8 alkyl group that is linear, branched, or cyclic.

31. The olefin-acrylate block copolymer of embodiment 29 or 30, wherein R is a C1-C26 hydrocarbyl group.

32. The olefin-acrylate block copolymer of embodiment 31, wherein R is a C1-C26, or C1-C10, or C1-C8 alkyl group that is linear, branched, or cyclic.

33. The olefin-acrylate block copolymer of embodiment 29 or 30, wherein R is a polyolefinyl group.

34. The olefin-acrylate block copolymer of embodiment 33, wherein the polyolefinyl group is an ethylene-based polymeryl group.

35. The olefin-acrylate block copolymer of embodiment of 34, wherein the polyolefinyl group is an ethylene homopolymeryl group comprising units derived from ethylene.

36. The olefin-acrylate block copolymer of embodiment 34, wherein the polyolefinyl group is an ethylene/alpha-olefin interpolymeryl group comprising units derived from ethylene and a C3-C30 alpha-olefin.

37. The olefin-acrylate block copolymer of embodiment 34, wherein the polyolefinyl group is an ethylene/alpha-olefin copolymeryl group comprising units derived from ethylene and a C3-C30 alpha-olefin.

38. The olefin-acrylate block copolymer of embodiment 36 or 37, wherein the C3-C30 alpha-olefin is selected from the group consisting of propylene, 1-butene, 1-hexene, and 1-octene.

39. The olefin-acrylate block copolymer of embodiment 34, wherein the polyolefinyl group is an ethylene/alpha-olefin multiblock interpolymeryl group.

40. The olefin-acrylate block copolymer of embodiment 33, wherein the polyolefinyl group is selected from the group consisting of a polymeryl group of a block composite, a specified block composite, and a crystalline block composite.

41. The olefin-acrylate block copolymer of embodiment 33, wherein the polyolefinyl group is a propylene-based polymeryl group.

42. The olefin-acrylate block copolymer of embodiment 41, wherein the polyolefinyl group is a propylene homopolymeryl group comprising units derived from propylene.

43. The olefin-acrylate block copolymer of embodiment 41, wherein the polyolefinyl group is a propylene/alpha-olefin interpolymeryl group comprising units derived from propylene and either ethylene or a C4-C30 alpha-olefin.

44. The olefin-acrylate block copolymer of embodiment 41, wherein the polyolefinyl group is a propylene/alpha-olefin copolymeryl group comprising units derived from propylene and either ethylene or a C4-C30 alpha-olefin.

45. The olefin-acrylate block copolymer of embodiment 43 or 44, wherein the C4-C30 alpha-olefin is selected from the group consisting of 1-butene, 1-hexene, and 1-octene.

46. The olefin-acrylate block copolymer of any of embodiments 33-45, wherein the polyolefinyl group can be defined by the properties of R—H, and wherein R—H has a number average molecular weight of greater than 365 g/mol.

47. The olefin-acrylate block copolymer of any of embodiments 33-46, wherein the polyolefinyl group can be defined by the properties of R—H, and wherein R—H has a number average molecular weight of from greater than 365 g/mol to 10,000,000 g/mol, or from greater than 365 g/mol to 5,000,000 g/mol, or from greater than 365 g/mol to 1,000,000 g/mol, or from greater than 365 g/mol to 750,000 g/mol, or from greater than 365 g/mol to 500,000 g/mol, or from greater than 365 g/mol to 250,000 g/mol.

48. The olefin-acrylate block copolymer of any of embodiments 33-47, wherein the polyolefinyl group can be defined by the properties of R—H, and wherein R—H has a density from 0.850 to 0.965 g/cc, or from 0.860 to 0.950 g/cc, or from 0.865 to 0.925 g/cc. wherein the polyolefinyl group can be defined by the properties of R—H, and wherein R—H has a melt index (I2) from 0.01 to 2,000 g/10 minutes, or from 0.01 to 1,500 g/10 minutes, or from 0.1 to 1,000 g/10 minutes, or from 0.1 to 500 g/10 minutes, or from 0.1 to 100 g/10 minutes.

49. The olefin-acrylate block copolymer of any of embodiments 33-48, wherein the polyolefinyl group can be defined by the properties of R—H, and wherein R—H has a number average molecular weight distribution (Mw/Mn) from 1 to 10, or from 1 to 7, or from 1 to 5, or from 2 to 4.

50. The olefin-acrylate block copolymer of any of embodiments 33-49, wherein y is 1, and m is 1.

51. The olefin-acrylate block copolymer of any of embodiments 33-50, wherein the acrylate monomer has the formula (III):

(III)

wherein R1 is hydrogen or a C1-C30 hydrocarbyl group and R2 is hydrogen or a methyl group.

Test Methods

Density:

Density is measured in accordance with ASTM D-792, Method B.

Melt Index:

Melt index ($I_2$) is measured in accordance with ASTM D-1238, which is incorporated herein by reference in its entirety, Condition 190° C./2.16 kg, and was reported in grams eluted per 10 minutes.

GPC

Sample polymers were tested for their properties via GPC according to the following.

A high temperature Gel Permeation Chromatography system (GPC IR) consisting of an Infra-red concentration detector (IR-5) from PolymerChar Inc (Valencia, Spain) was used for Molecular Weight (MW) and Molecular Weight Distribution (MWD) determination. The carrier solvent was 1,2,4-trichlorobenzene (TCB). The auto-sampler compartment was operated at 160° C., and the column compartment was operated at 150° C. The columns used were four Polymer Laboratories Mixed A LS, 20 micron columns. The chromatographic solvent (TCB) and the sample preparation solvent were from the same solvent source with 250 ppm of butylated hydroxytoluene (BHT) and nitrogen sparged. The samples were prepared at a concentration of 2 mg/mL in TCB. Polymer samples were gently shaken at 160° C. for 2 hours. The injection volume was 200 µl, and the flow rate was 1.0 ml/minute.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights.

The GPC column set was calibrated before running the examples by running twenty-one narrow molecular weight distribution polystyrene standards. The molecular weight (Mw) of the standards ranges from 580 to 8,400,000 grams per mole (g/mol), and the standards were contained in 6 "cocktail" mixtures. Each standard mixture had at least a decade of separation between individual molecular weights. The standard mixtures were purchased from Polymer Laboratories (Shropshire, UK). The polystyrene standards were prepared at 0.025 g in 50 mL of solvent for molecular weights equal to or greater than 1,000,000 g/mol and 0.05 g in 50 mL of solvent for molecular weights less than 1,000,000 g/mol. The polystyrene standards were dissolved at 80° C. with gentle agitation for 30 minutes. The narrow standards mixtures were run first and in order of decreasing highest molecular weight (Mw) component to minimize degradation. The polystyrene standard peak molecular weights were converted to polyethylene Mw using the Mark-Houwink constants. Upon obtaining the constants, the two values were used to construct two linear reference conventional calibrations for polyethylene molecular weight and polyethylene intrinsic viscosity as a function of elution column.

The polystyrene standard peak molecular weights were converted to polyethylene molecular weights using the following equation (as described in Williams and Ward, J. Polym. Sci., Polym. Let., 6, 621 (1968)):

$$M_{polyethylene} = A(M_{polystyrene})^B \quad (1)$$

Here B has a value of 1.0, and the experimentally determined value of A is around 0.41.

A third order polynomial was used to fit the respective polyethylene-equivalent calibration points obtained from equation (1) to their observed elution volumes of polystyrene standards.

Number, weight, and z-average molecular weights were calculated according to the following equations:

$$\overline{Mn} = \frac{\sum^i W f_i}{\sum^i (W f_i/M_i)} \quad (2)$$

$$\overline{Mw} = \frac{\sum^i (W f_i * M_i)}{\sum^i W f_i} \quad (3)$$

$$\overline{Mz} = \frac{\sum^i (W f_i * M_i^2)}{\sum^i (W f_i * M_i)} \quad (4)$$

Where, $Wf_i$ is the weight fraction of the i-th component and $M_i$ is the molecular weight of the i-th component.

The MWD was expressed as the ratio of the weight average molecular weight (Mw) to the number average molecular weight (Mn).

The accurate A value was determined by adjusting A value in equation (1) until Mw calculated using equation (3) and the corresponding retention volume polynomial, agreed with the known Mw value of 120,000 g/mol of a standard linear polyethylene homopolymer reference.

The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors could include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector was used for calculation purposes.

Data collection was performed using Viscotek TriSEC software, Version 3, and a 4-channel Viscotek Data Manager DM400. The system was equipped with an on-line solvent degassing device from Polymer Laboratories (Shropshire, UK). Suitable high temperature GPC columns could be used, such as four 30 cm long Shodex HT803 13 micron columns or four 30 cm Polymer Labs columns of 20-micron mixed-pore-size packing (MixA LS, Polymer Labs). The sample carousel compartment was operated at 140° C. and the column compartment was operated at 150° C. The samples were prepared at a concentration of 0.1 grams of polymer in 50 milliliters of solvent. The chromatographic solvent and the sample preparation solvent contain 200 ppm of butylated hydroxytoluene (BHT). Both solvents were sparged with nitrogen. The polyethylene samples were gently stirred at 160° C. for four hours (4 h). The injection volume was 200 microliters (μL). The flow rate through the GPC was set at 1 mL/minute.

NMR ($^{13}$C and $^{1}$H):

NMR analysis was performed at room temperature using a standard NMR solvent, such as chloroform or benzene, and data was acquired on a Varian 500 MHz spectrometer.

Diffusion NMR: The experiment employed 2048 scans and a repetition time of 15 s. The spectrum was centered at 90 ppm and covered a bandwidth of 240 ppm. Self-diffusion coefficient (D) was measured by 1H and 13C-detected diffusion using the pulsed-field-gradient NMR with double stimulated echo to mitigate any artifact by thermal convection. In general, the method utilized spatial variation of magnetic field, i.e. magnetic field gradient (g), to physically label the spatial positions of molecular ensembles during a well-defined time interval, thereby coupling the NMR peak intensity to the self-diffusion (D) of each molecule. D is quantified using the Stejskal-Tanner equation (Eq. 5), where I and I0 represent the NMR signal intensity with/without gradient. $\gamma$ is the gyromagnetic ratio of nuclei, g is gradient strength, $\delta$ is the gradient pulse duration and $\Delta$ is the diffusion time. Bearing in mind that peaks from the same molecule must yield the same D, such a method enables inherent separation of NMR peaks by virtue of D associated with each peak without perturbing the spectra resolution. This method in nature can also be considered as an analogue to the size exclusion chromatography (SEC), i.e. large molecule diffuses slow/elute early or vice versa. Thus, the measurement provides explicit intermolecular information to reveal if the polymer backbone is capped by a specific end group by comparing $D_{end}$ vs. $D_{backbone}$.

$$I = I_0 \exp\left(-D\gamma^2\delta^2 g^2\left(\Delta - \frac{\delta}{3}\right)\right) \quad (5)$$

GCMS:

Tandem gas chromatography/low resolution mass spectroscopy using electron impact ionization (EI) is performed at 70 eV on an Agilent Technologies 6890N series gas chromatograph equipped with an Agilent Technologies 5975 inert XL mass selective detector and an Agilent Technologies Capillary column (HP1MS, 15 m×0.25 mm, 0.25 micron) with respect to the following:

Programed method:
Oven Equilibration Time at 50° C. for 0.5 min
then 25° C./min to 200° C., and hold for 5 min
Run Time 11 min

EXAMPLES

The following examples are intended to illustrate some embodiments of the invention and should not be interpreted as limiting the scope of the invention set forth in the claims.

Unless stated otherwise, all materials and reagents are commercially available from, for example, Sigma Aldrich.

Example 1

Figure 1A:
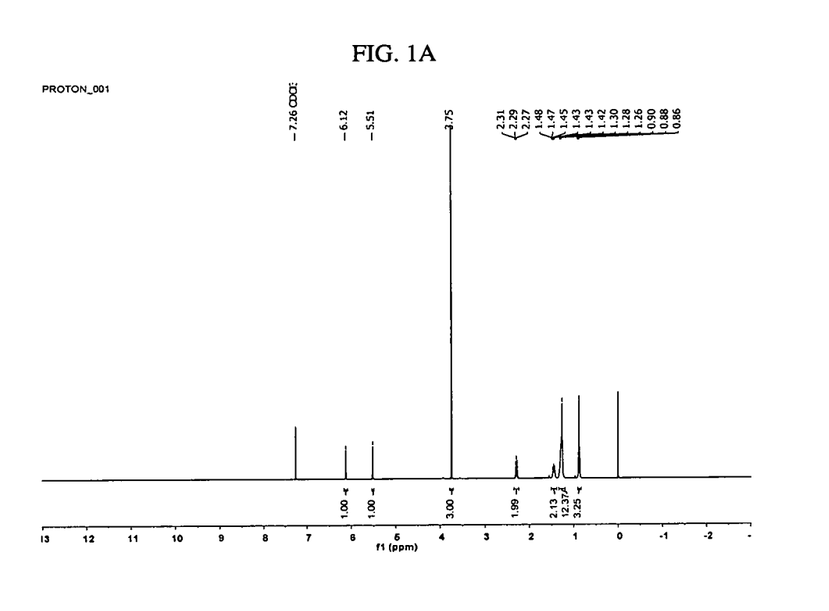
FIGS. 1A and 1B provide the $^1$H NMR and $^{13}$C NMR spectra, respectively, for Example 1.
Figure 1B:
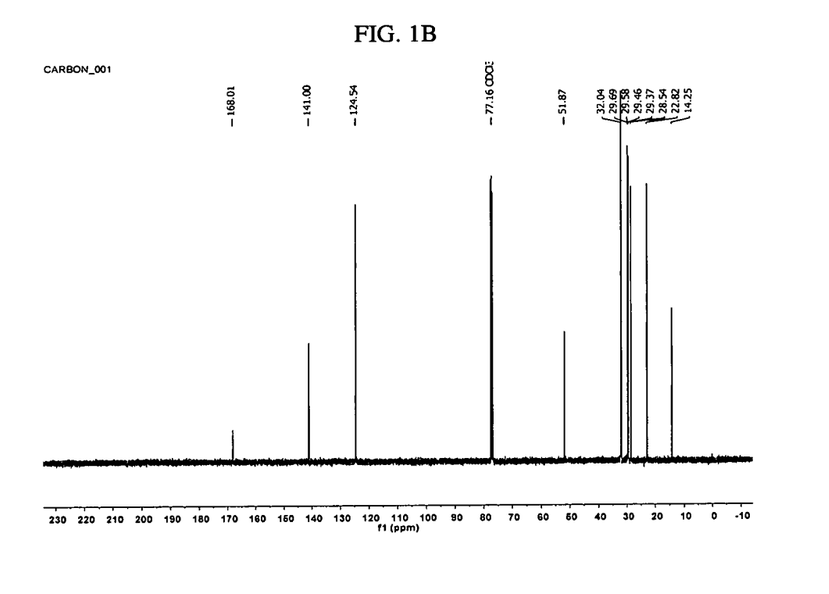
Figure 1C:
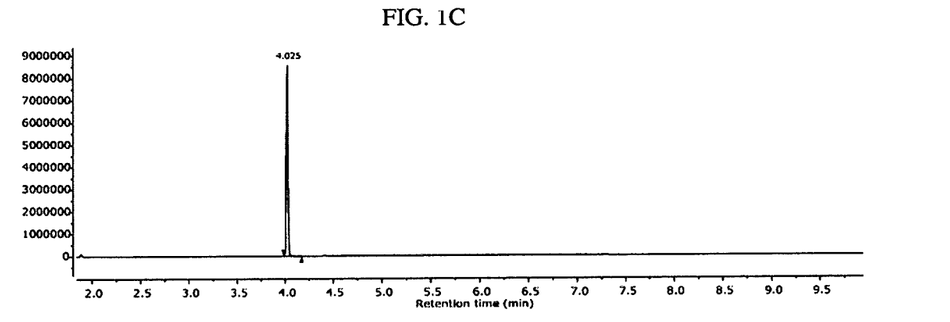
FIGS. 1C and 1D provide the GCMS spectra for Example 1.
Figure 1D:
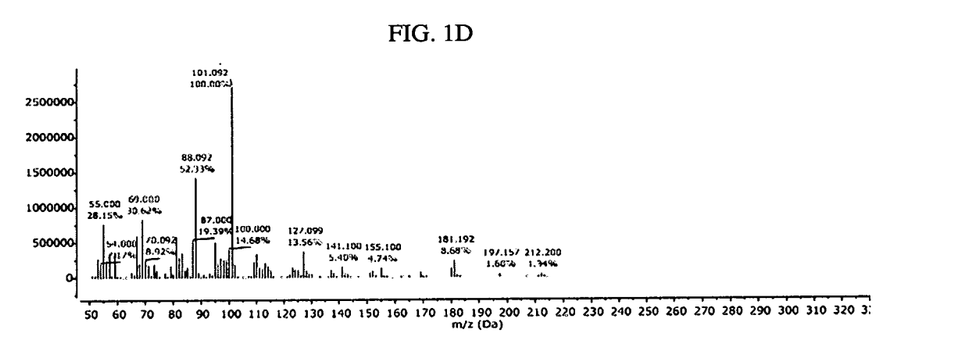

The reaction of Example 1 was performed under an inert nitrogen atmosphere glovebox and in accordance with the above reaction scheme which is exemplary and non-limiting. 5.88 mL of a 0.30 M dioctylzinc solution in Isopar™ E (1.76 mmol) was added to a 20 mL vial. The solution was heated to 60° C. 0.500 g methyl 2-(chloromethyl)acrylate (3.72 mmol, 2 equiv.) was added dropwise to the hot dioctylzinc solution. Over the course of the slow addition, the solution turned from light brown to clear and became cloudy with a visible white precipitate. After several minutes, the precipitate settled as a sticky yellow residue on the bottom of the vial. After 48 hours at 60° C., 83 mg of hexamethylbenzene (0.511 mmol) was added as an NMR internal standard. The NMR conversion was calculated to be 62.6%. NMR analysis is shown in FIGS. 1A and 1B. As seen in FIGS. 1C and 1D, GC-MS of a reaction aliquot showed formation of the desired product (lower retention time peaks correspond to Isopar™ E). The reaction was quenched with water. Purification to remove Zn salts and the internal standard was carried out by column chromatography eluting with a 2% ethyl acetate in hexanes mixture. 405 mg of product was isolated (51%).

Example 2

Reaction was performed in a nitrogen-atmosphere glovebox following the ATRP procedure described in Macromolecules vol 33, 4039-4047, 2000. t-BA was passed through an alumina cartridge prior to start of the reaction to remove inhibitor. CuBr (78.2 mg, 0.545 mmol), CuBr2 (6.0 mg, 0.027 mmol), and 1,3,5-trimethoxybenzene (9 mg, 0.054 mmol) were added to a dry 20 mL vial. Deoxygenated acetone (1 mL) was added, after which t-BA (4.0 mL, 27.6 mmol) was added. PMDETA (120 µL, 0.575 mmol) was added, and the solution was stirred until the Cu complex had formed, approximately 20 minutes. After complex formation, methyl 2-bromopropionate (121 µL, 1.09 mmol) were added to the flask, an initial sample was removed, and the vial was heated to 55° C. An increase in viscosity was observed indicating polymerization had taken place. After most of the monomer had been reacted as determined by NMR, methyl 2-methyleneundecanoate (0.232 g, 1.09 mmol) was added and the reaction was left to stir overnight at 55° C.

Figure 2A:
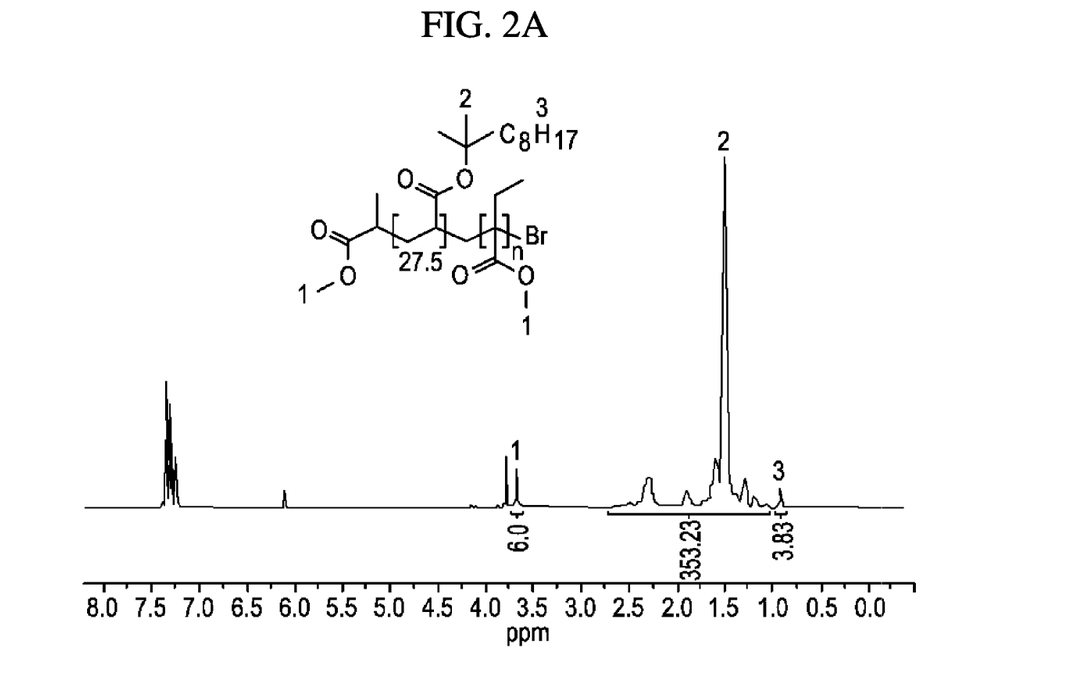
FIGS. 2A and 2B provide $^1$H NMR and diffusion NMR spectra, respectively, for Example 2.
Figure 2B:
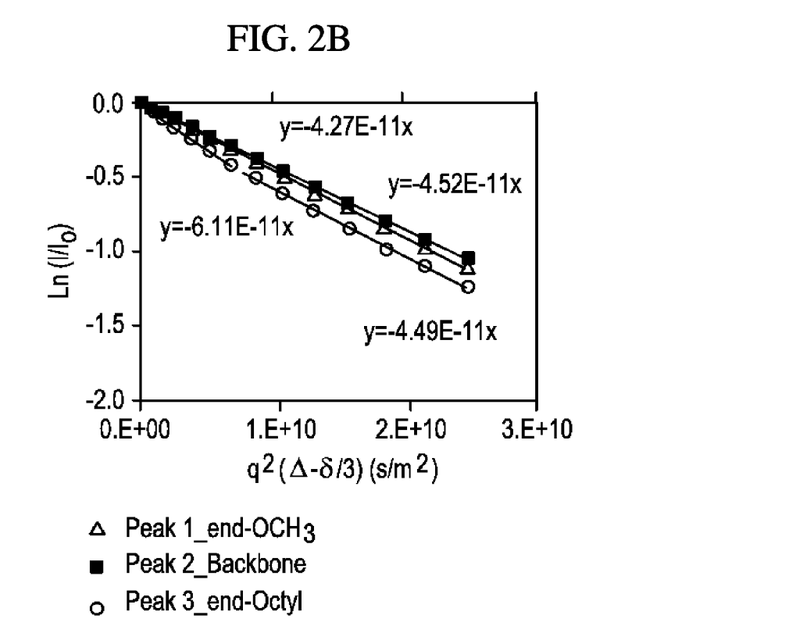

By NMR (as seen in FIGS. 2A and 2B), all the compound prepared in Example 1 had reacted after overnight reaction. Approximately 10 mL THF was added to the vial to dissolve the polymer and the reaction mixture was passed through an alumina column to remove the copper catalyst. Attempts to crash the polymer into cold hexanes were unsuccessful. Solvent was removed on the rotovap and a viscous yellow polymer was obtained. The polymer was washed with chlorobenzene to remove excess hexanes and THF and dried under vacuum overnight at 70° C.

By GPC: Mw=3726, Mn=3125, and PDI=1.19.

Example 3

Reaction was performed in a nitrogen-atmosphere glovebox following the ATRP procedure described in Macromolecules vol 33, 4039-4047, 2000. t-BA was passed through an alumina cartridge prior to start of the reaction to remove inhibitor. CuBr (78.2 mg, 0.545 mmol) and CuBr2 (6.0 mg, 0.027 mmol) were added to a dry 20 mL vial. Deoxygenated acetone (1 mL) was added, after which t-BA (4.0 mL, 27.6 mmol) was added. PMDETA (120 µL, 0.575 mmol) was added, and the solution was stirred until the Cu complex had formed, approximately 20 minutes. After complex formation, methyl 2-bromopropionate (61 µL, 0.547 mmol) were added to the flask, an initial sample was removed, and the vial was heated to 60° C. After three hours, before all monomer had reacted, the reaction was stopped by adding THF to the reaction mixture and passing the solution through an alumina plug to remove the Cu catalyst. THF was removed on the rotovap, followed by drying on the Schlenk line over the weekend at 70° C. to remove most of the THF. The polymer after drying was a pink solid (2.18 g). The flask was returned to the glovebox and 10 mL degassed acetone was added. The 0.044 M solution of poly(t-butylacrylate) was used for the next step.

CuBr (0.015 g, 0.1046 mmol), methyl 2-methyleneundecanoate (0.026 g, 0.122 mmol), and 1 mL degassed acetone were added to a 20 mL vial with a stirbar. PMDETA (0.023 mL, 0.110 mmol) was added and the mixture was allowed to stir for 20 minutes. 2.37 mL of the poly(t-butylacrylate) macroinitiator solution was injected via syringe to the reaction vial. An initial sample was removed and the reaction was allowed to stir at 55° C. After overnight reaction, NMR showed about 30% conversion. The acetone solvent was partially removed with nitrogen to increase the concentration of the reactants.

After 36 hrs, the reaction was stopped by removing the vial from the heating block, adding about 20 mL THF, and passing the solution through a plug of alumina to remove the copper catalyst. Attempts to crash the polymer into cold hexanes were unsuccessful. The solution was dried on the rotovap, washed with chlorobenzene to remove excess hexanes and THF, and dried under vacuum overnight at 70° C.

Figure 3A:
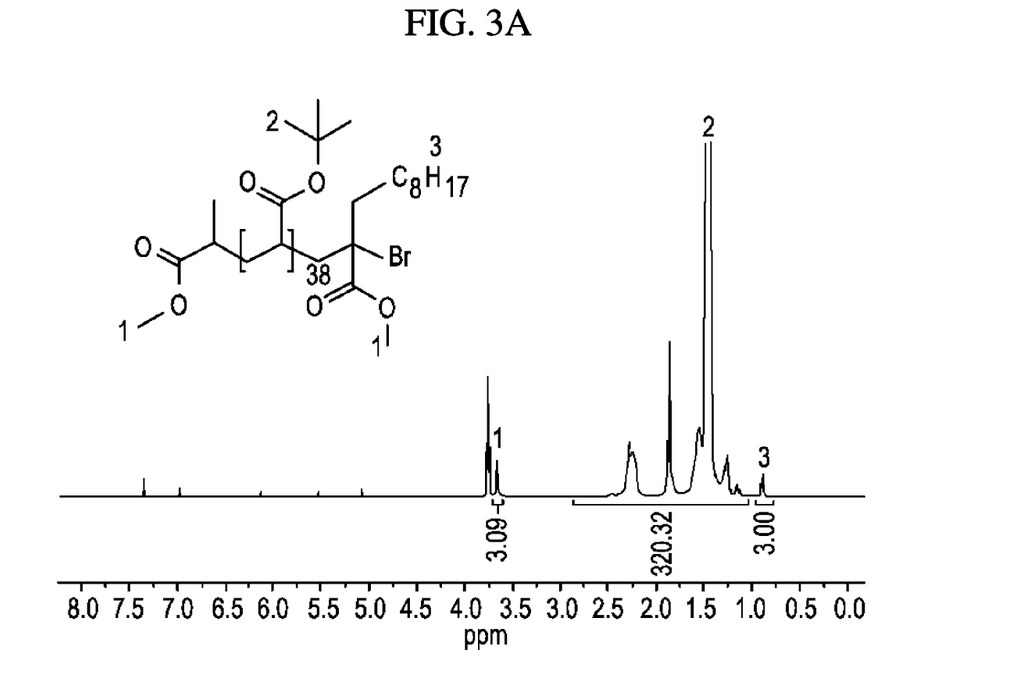
FIGS. 3A and 3B provide $^1$H NMR and diffusion NMR spectra, respectively, for Example 3.
Figure 3B:
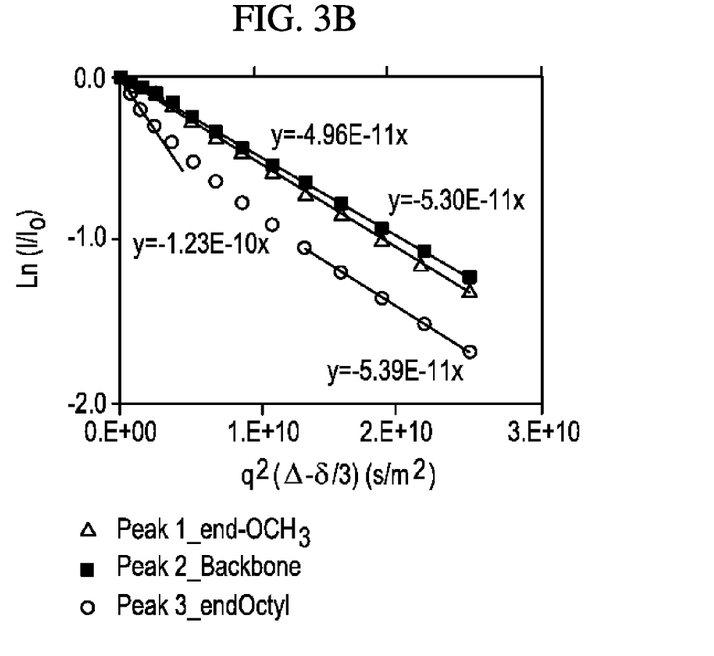

The NMR spectra for Example 3 are seen in FIGS. 3A and 3B.

By GPC: Mw=6906, Mn=5795, and PDI=1.19. By 1H NMR: Mn=5250.

What is claimed is:

1. A process for preparing an olefin-acrylate block copolymer, the process comprising:
   a) Performing atom transfer radical polymerization (ATRP), by combining ATRP material comprising an acrylate monomer with the formula (III), an initiator having a radically transferrable atom or group, a transition metal compound, and a ligand, thereby forming a macroinitiator; and
   b) combining reaction materials comprising an alpha-substituted acrylate and the macroinitiator, thereby forming the olefin-acrylate block copolymer wherein:
   the alpha-substituted acrylate has the formula (II)

(II)

wherein R is a polyolefinyl group and R1 independently is hydrogen or a C1-C30 hydrocarbyl group;
the acrylate monomer has the formula (III):

(III)

wherein R1 independently is hydrogen or a C1-C30 hydrocarbyl group;
each R2 independently is hydrogen or a methyl group;
the initiator has the formula (IV):

(IV)

the macroinitiator has the formula (V):

polyacrylate-(X)$_y$     (V);

the olefin-acrylate block copolymer has the formula (VI):

(VI)

wherein:

each R1 independently is hydrogen or a C1-C30 hydrocarbyl group;

each R2 independently is hydrogen or a methyl group;

each R independently is a polyolefinyl group;

m is from 1 to 50;

each y independently is from 1 to 100;

each X independently is selected from the group consisting of a halide, $OR^{10}$, $SR^{14}$, $SeR^{14}$, —SCN (thiocyanate), $OC(=O)R^{14}$, $OP(=O)R^{14}$, $OP(=O)(OR^{14})_2$, $OP(=O)OR^{14}$, O—$N(R^{14})_2$, and S—$C(=S)N(R^{14})_2$, where $R^{14}$ is aryl or a straight or branched C1-C20 alkyl group, or when an $N(R^{14})_2$ group is present, the two $R^{14}$ groups may be joined to form a 5-, 6-, or 7-membered heterocyclic ring, and where $R^{10}$ is alkyl of from 1 to 20 carbon atoms, in which each of the hydrogen atoms may be independently replaced by halide;

R11, R12, and R13 are each independently selected from the group consisting of H, halide, C1-C20 alkyl, C3-C8 cycloalkyl, $C(=Y)R5$, $C(=Y)NR^6R^7$, COCl, OH, CN, C2-C20 alkenyl or alkynyl, oxiranyl, glycidyl, aryl, heterocyclyl, aralkyl, aralkylene (aryl-substituted alkenyl, and alkenyl is vinyl which may be substituted with one or two C1-C6 alkyl groups and/or halogen atoms), C1-C6 alkyl in which from 1 to all of the hydrogen atoms are replaced with halogen and C1-C6 alkyl substituted with from 1 to 3 substituents selected from the group consisting of C1-C4 alkoxy, aryl, heterocyclyl, $C(=Y)R^6$, $C(=Y)NR^6R^7$, oxiranyl and glycidyl; such that no more than two of R11, R12 and R13 are H;

Y may be $NR^8$ or O;

$R^5$ is alkyl of from 1 to 20 carbon atoms, alkoxy of from 1 to 20 carbon atoms, aryloxy or heterocyclyloxy, $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring, and $R^8$ is H, straight or branched C1-C20 alkyl and aryl; and "polyacrylate" represents the polyacrylate resulting from ATRP of the acrylate monomer.

2. The process of claim 1, wherein the polyolefinyl group is an ethylene-based polymeryl group.

3. The process of claim 1, wherein the polyolefinyl group is a propylene-based polymeryl group.

4. The process of claim 1, wherein the polyolefinyl group is defined by properties of R—H, and wherein R—H has a number average molecular weight of greater than 365 g/mol.

5. The process of claim 1, wherein each of steps a) and b) is performed at a temperature from 40° C. to 150° C.

6. The olefin acrylate block copolymer prepared by the process of claim 1.